(12) United States Patent
Christensen

(10) Patent No.: US 11,549,494 B2
(45) Date of Patent: Jan. 10, 2023

(54) METHOD FOR PERFORMING MAINTENANCE ON A WIND TURBINE PART

(71) Applicant: Vestas Wind Systems A/S, Aarhus N (DK)

(72) Inventor: Jan Christensen, Brabrand (DK)

(73) Assignee: Vestas Wind Systems A/S, Aarhus N (DK)

( * ) Notice: Subject to any disclaimer, the term of this patent is extended or adjusted under 35 U.S.C. 154(b) by 143 days.

(21) Appl. No.: 16/641,865

(22) PCT Filed: Oct. 26, 2018

(86) PCT No.: PCT/DK2018/050272
§ 371 (c)(1),
(2) Date: Feb. 25, 2020

(87) PCT Pub. No.: WO2019/086087
PCT Pub. Date: May 9, 2019

(65) Prior Publication Data
US 2020/0256320 A1   Aug. 13, 2020

(30) Foreign Application Priority Data
Nov. 3, 2017 (EP) .................................... 17199863

(51) Int. Cl.
*F03D 80/50* (2016.01)
*F03D 13/25* (2016.01)

(52) U.S. Cl.
CPC ............. *F03D 80/50* (2016.05); *F03D 13/25* (2016.05)

(58) Field of Classification Search
CPC ... F03D 80/50; F03D 13/25; E04G 2003/286; E04G 2003/30
See application file for complete search history.

(56) References Cited

U.S. PATENT DOCUMENTS 7,521,083 B2 * 4/2009 Teichert .................. F03D 80/50
427/140
7,740,107 B2 * 6/2010 Lemburg ................ F03D 80/50
182/142
(Continued)

FOREIGN PATENT DOCUMENTS

CN   1396886 A   2/2003
CN   102583198 A   7/2012
(Continued)

OTHER PUBLICATIONS

European Patent Office, Extended Search Report in EP Application No. 18874405.6, dated Sep. 2, 2021.
(Continued)

*Primary Examiner* — Justin D Seabe
(74) *Attorney, Agent, or Firm* — Wood Herron & Evans LLP

(57) ABSTRACT

A method for performing maintenance on an outer surface of at least one wind turbine part, such as a tower (2), a nacelle (3) or a wind turbine blade (5), of an offshore wind turbine (1) is disclosed. An access system (10) is transported to a site of the offshore wind turbine (1), and the access system (10) is transferred to a transition platform (6) at a lower part of the offshore wind turbine (1), while operating the offshore wind turbine (1) in accordance with a normal operating mode. Normal operation of the offshore wind turbine (1) is then stopped, and maintenance is performed on an outer surface of at least one wind turbine part (2, 3, 5) of the offshore wind turbine (1), using the access system (10). When the maintenance has been completed, normal operation of the offshore wind turbine (1) is restarted in accordance with a normal operating mode. Normal operation of the offshore wind turbine (1) is only stopped while the actual (Continued)

maintenance takes place. Thereby the loss in power production is minimised.

13 Claims, 10 Drawing Sheets

(56) References Cited

U.S. PATENT DOCUMENTS

| | | | |
|---|---|---|---|
| 10,487,806 B2* | 11/2019 | Huot | E02B 17/0034 |
| 10,801,220 B2* | 10/2020 | Oowaku | F03D 80/50 |
| 2005/0218656 A1* | 10/2005 | Wobben | F03D 13/20 |
| | | | 290/55 |
| 2013/0035798 A1* | 2/2013 | Zhou | F03D 80/50 |
| | | | 700/287 |
| 2015/0016976 A1 | 1/2015 | Roer et al. | |
| 2015/0204193 A1* | 7/2015 | Anasis | F01D 5/005 |
| | | | 29/889.1 |

FOREIGN PATENT DOCUMENTS

| | | | | |
|---|---|---|---|---|
| CN | 103502636 | A | 1/2014 | |
| CN | 105122779 | A | 12/2015 | |
| CN | 105793560 | A | 7/2016 | |
| CN | 107152381 | A | 9/2017 | |
| CN | 107269476 | A | 10/2017 | |
| CN | 206537453 | U | 10/2017 | |
| DE | 102015010804 | A1 | 2/2017 | |
| EP | 2505541 | A1 | 10/2012 | |
| EP | 2586933 | A1 | 5/2013 | |
| GB | 2476329 | A | 6/2011 | |
| KR | 20130128877 | A | 11/2013 | |
| WO | 2004081373 | A2 | 9/2004 | |
| WO | WO-2004111443 | A1 * | 12/2004 | ............ F03D 1/003 |
| WO | 2009121792 | A2 | 10/2009 | |
| WO | 2012149935 | A1 | 11/2012 | |
| WO | 2015003694 | A1 | 1/2015 | |
| WO | 2017000944 | A1 | 1/2017 | |

OTHER PUBLICATIONS

The Hague, European Search Report in EP Application No. 17199863, dated May 9, 2018.
Nordic Patent Institute, International Search Report and Written Opinion in PCT Application No. PCT/DK2018/050272, dated Dec. 4, 2018.
On-Shore & Offshore: Rotor Blade Inspection & Repair; Wind Energy—Limpet Technology Website [online]; retrieved from internet on Nov. 29, 2020; http://www.limpettechnology.com/wind-energy.html; see picture and text.
T.H. White Marketing, Palfinger Systems SHC—Service Handling Concept Wind, YouTube [online] [video]. Mar. 28, 2011 [retrieved on Nov. 29, 2018], Retrieved from https://www.youtube.com/watch?v=2G1xHk3TJI.
China National Intellectual Property Administration, 2nd Notification of Office Action in CN Application No. 201880067140.7, dated Sep. 24, 2021.
China National Intellectual Property Administration, First Notification of Office Action in CN Application No. 201880067140.7, dated Jun. 3, 2021.
Taiwan Patent Office, Official Letter in TW Application No. 11120521090, dated May 30, 2022.

* cited by examiner

METHOD FOR PERFORMING MAINTENANCE ON A WIND TURBINE PART

FIELD OF THE INVENTION

The present invention relates to a method for performing maintenance on an outer surface of at least one wind turbine part of an offshore wind turbine.

BACKGROUND OF THE INVENTION

In wind turbines, it may be necessary to perform maintenance on outer surfaces of wind turbine parts, such as wind turbine blades, tower, nacelle, etc. On outer surfaces here refers to a part of the wind turbine reached via the outer surface and also comprises for example sensors, mechanical parts or lightening conductors arranged in or under the outer surface. Such maintenance may include inspection, repair, cleaning, coating or painting, replacement or addition of elements, etc. The maintenance typically requires that access is gained to the relevant outer surfaces of the relevant wind turbine parts, and this will often require that the rotor of the wind turbine is stopped, thereby stopping operation of the wind turbine and disrupting the power production of the wind turbine. This is costly and undesirable, and therefore the length of the time that operation of the wind turbine is stopped should be minimised.

In offshore wind turbines, it is difficult to reduce the length of the time that operation of the wind turbine is stopped due to maintenance of outer surfaces of the wind turbine parts, because a vessel must be pre-booked for transporting equipment and personnel required for performing the maintenance to the offshore site, and the equipment must be transferred to the wind turbine and the maintenance performed while suitable wind and weather conditions prevail. This will often lead to the rotor of the wind turbine, and thereby power production, of the wind turbine having to be stopped for a considerable period of time.

WO 2015/003694 A1 discloses a device for inspecting a wind turbine. The device comprises an inspection platform that can be moved vertically along a tower of a wind turbine, wherein the inspection platform comprises at least two modules pivotably connected to each other. The inspection platform can be moved by means of cables connected to the nacelle of the wind turbine.

WO 2004/081373 A2 discloses a maintenance platform for suspending supporting cables, particularly for servicing rotor blades of wind power plants. The maintenance platform is constructed of at least two partial platforms connected to one another via a pivot joint in a manner that enables them to pivot about a pivot axis.

EP 2 586 933 A1 discloses a working platform for an offshore wind energy plant. The working platform is configured to be mounted to an outside wall of the tower of the offshore wind energy plant.

DESCRIPTION OF THE INVENTION

It is an object of embodiments of the invention to provide a method for performing maintenance on an outer surface of at least one wind turbine part of an offshore wind turbine, in which a power production loss due to the performed maintenance is reduced as compared to prior art methods.

It is a further object of embodiments of the invention to provide a method for performing maintenance on an outer surface of at least one wind turbine part of an offshore wind turbine, in which a duration of stopped operation of the wind turbine is minimised.

It is an even further object of embodiments of the invention to provide an access system for performing maintenance on an outer surface of at least one wind turbine part of an offshore wind turbine, the access system allowing power production loss during maintenance to be minimised.

According to a first aspect the invention provides a method for performing maintenance on an outer surface of at least one wind turbine part of an offshore wind turbine, the method comprising the steps of:

transporting an access system to a site of the offshore wind turbine, transferring the access system to a transition platform at a lower part of the offshore wind turbine, while operating the offshore wind turbine in accordance with a normal operating mode, stopping normal operation of the offshore wind turbine, performing maintenance on an outer surface of at least one wind turbine part of the offshore wind turbine, using the access system, and restarting normal operation of the offshore wind turbine in accordance with a normal operating mode when the maintenance has been completed.

Thus, according to the first aspect, the invention provides a method for performing maintenance on an outer surface of at least one wind turbine part of an offshore wind turbine. In the present context, the term 'maintenance' should be interpreted in a broad manner, e.g. to include inspection of the outer surface, repair performed on the outer surface, removal, addition or replacement of elements, such as sensors, lights, coolers, airbrakes, lightning conductors, etc., coating or painting of the outer surface, cleaning, or any other suitable kind of maintenance which requires access to the outer surface of a relevant wind turbine part.

The wind turbine part could, e.g., be a wind turbine blade, a wind turbine tower, a nacelle, or any other suitable kind of wind turbine part having an outer surface, i.e. a surface which can be accessed from the outside, i.e. without entering the interior of the wind turbine.

The method according to the first aspect of the invention is performed on an offshore wind turbine. In the present context the term 'offshore wind turbine' should be interpreted to mean a wind turbine which is positioned at an offshore site, located at sea. Access to offshore wind turbines is usually more difficult than access to onshore wind turbines, i.e. wind turbines positioned at onshore sites, i.e. on dry land. This is, among other things, due to the fact that equipment and personnel need to be transported to the offshore wind turbine by means of a sea vessel or a helicopter, and suitable wind and weather conditions are more critical than is the case for onshore wind turbines. This will be described in further detail below.

In the method according to the first aspect of the invention, an access system is initially transported to a site of the offshore wind turbine. This could, e.g., include transporting the access system by means of a sea vessel, such as a barge or a crew transfer vessel. In the present context, the term 'access system' should be interpreted to mean a system, an apparatus or a device which enables access to relevant outer surfaces of relevant wind turbine parts. For instance, the access system may include a platform allowing personnel to access an outer surface, e.g. in order to visually inspect the surface and/or perform relevant maintenance tasks. Furthermore, the access system may include means for moving the access system along a relevant outer surface, e.g. along a wind turbine blade or along a tower. This could, e.g., include suitable hoisting mechanisms, cables, guides, etc. The access system may further include relevant equipment for performing the maintenance, such as inspection cameras, cleaning equipment, paint brushes, etc., depending on the kind of maintenance to be performed. It is preferred that the access system can carry at least one person (more preferably at least two persons for safer operation) and allow the operator easy access to the area around the outer surface to be maintained. Typically, the access system used according to the method has a weight of at least 500 kg including tools and consumables used for the maintenance.

When the access system has been transported to the site of the offshore wind turbine, it is transferred to a transition platform at a lower part of the offshore wind turbine. In the case that the access system has been transported to the site of the offshore wind turbine by means of a sea vessel, such as a barge or a crew transfer vessel, the access system is transferred from the sea vessel to the transition platform. In the present context the term 'transition platform' should be interpreted to mean a platform which is permanently arranged at the lower part of the offshore wind turbine, and which is used for transferring personnel and equipment from sea vessels to the offshore wind turbine. It may further be possible to gain access to the interior of the wind turbine from the transition platform, e.g. via a door or the like formed in the tower.

During the transfer of the access system to the transition platform, the offshore wind turbine operates in accordance with a normal operating mode. Accordingly, it is not necessary to stop normal operation of the offshore wind turbine during this transfer, and thereby a normal power production is maintained. Thus, during this part of the maintenance process there is no power production loss, and thereby no adverse economic effect on the owner or operator of the offshore wind turbine. Furthermore, this step may even be performed at a time where the weather conditions are particularly favourable with respect to power production, e.g. at wind speeds between a nominal wind speed and a cut-out wind speed. Under such circumstances it is very undesirable and costly to stop operation of the wind turbine.

When the access system has been transferred to the transition platform, normal operation of the offshore wind turbine is stopped. This step may be deferred until suitable conditions prevail. This will be described in further detail below. When normal operation of the offshore wind turbine has been stopped, the offshore wind turbine no longer produces power. Furthermore, the rotor has been stopped, and thereby it is possible to perform maintenance on an outer surface of a relevant wind turbine part without risking collisions between the access system and the wind turbine blades.

Thus, when normal operation of the offshore wind turbine has been stopped, maintenance is performed on an outer surface of at least one wind turbine part of the offshore wind turbine, using the access system. As described above, the access system can be operated in order to perform the required maintenance without risking collisions between the access system or cabling with rotating wind turbine blades, because normal operation of the offshore wind turbine has been stopped. For instance, maintenance may be performed on an outer surface of at least one of the wind turbine blades of the offshore wind turbine.

When the maintenance has been completed, operation of the offshore wind turbine is restarted in accordance with a normal operating mode. Thereby normal power production of the offshore wind turbine is restored as soon as the maintenance has been completed.

According to the method of the first aspect of the present invention, normal operation of the offshore wind turbine is only stopped while the actual maintenance on the outer surface(s) is performed. Accordingly, the loss in power production, and thereby the economic loss to the owner of the offshore wind turbine, is minimised. This is contrary to similar prior art methods, where the normal operation of the offshore wind turbine needs to be stopped also while an access system, or other required equipment, is transferred to the offshore wind turbine.

Furthermore, in prior art methods, the maintenance must be carefully planned and coordinated with weather forecasts and availability of suitable sea vessels, such as barges or crew transfer vessels. This is not required in the method according to the first aspect of the invention. In the method according to the first aspect of the invention, the access system can be transported to the site of the offshore wind turbine and transferred to the transition platform of the offshore wind turbine whenever a suitable sea vessel is available and tolerable weather conditions prevail. All of this is performed without stopping normal operation of the offshore wind turbine, and thereby without loss in power production. Once the access system is positioned at the transition platform, a suitable time window for performing the maintenance can be awaited, for instance a time window where relevant maintenance personnel is available, stricter weather or wind conditions are fulfilled, etc. Normal operation of the offshore wind turbine is only stopped when the actual maintenance is performed, i.e. only during a minimal time interval. Accordingly, the maintenance is performed with a minimum loss in power production, and thereby a minimum economic loss. Due to safety reasons, the launching of access systems from a vessel requires very low wave height, and situations may therefore arise where the wind speed is too low for production of energy and hence optimum for maintenance of an outer surface of a wind turbine park while at the same time the wave height is too high for safe launching of access systems from a vessel. Here, the method according to the invention allows for inspection as the access system is launched from the transition platform, where it may have been parked for example one or more days before.

It is, thus, a great advantage of the method according to the first aspect of the invention, that the step of transferring the access system to the transition platform and the step of performing maintenance on the outer surface of the wind turbine part are completely decoupled, since it allows each of the steps to be performed at a time which is optimal for that specific step, and because the power production loss resulting from the maintenance is kept at an absolute minimum.

None of the prior art documents mentioned above describes an access system being transferred to a transition platform of an offshore wind turbine while the wind turbine continues operation. In particular, the maintenance platform disclosed in WO 2004/081373 A2 is constructed in a manner which does not allow it to be transferred to and assembled on a transition platform of an offshore wind power plant while the wind power plant continues operation.

The problem of power production loss during maintenance of outer surfaces of wind turbine parts is particularly relevant with respect to offshore wind turbines. Offshore wind turbines are normally larger than onshore wind turbines, and thereby the loss in power production is in general higher when operation of an offshore wind turbine is stopped than when operation of an onshore wind turbine is stopped. Furthermore, the requirements regarding availability of a suitable vessel and wind or weather conditions during transport of relevant equipment are much higher for offshore wind turbines than for onshore wind turbines. For instance, in prior art methods it may be necessary that the sea vessel is docked at the offshore wind turbine during the entire maintenance process, from transferring the equipment to the offshore wind turbine, during the actual maintenance process and until the equipment has been transferred back to the sea vessel. This is not necessary in the method according to the first aspect of the invention, because the access system is transferred to the transition platform, and is operated therefrom during the actual maintenance process, and therefore the sea vessel need not to be docked at the offshore wind turbine once the access system has been transferred to the transition platform, and thereby the sea vessel can be used for other purposes afterwards.

The access system may comprise two or more detachably assembled modules, and the step of transferring the access system to the transition platform may comprise transferring the two or more modules to the transition platform, and the method may further comprise the step of assembling the access system from the two or more modules at the transition platform.

According to this embodiment, the access system is of a modular kind, and it is transported to the site of the offshore wind turbine and transferred to the transition platform of the offshore wind turbine in a disassembled state, i.e. the individual modules of the access system are transported and transferred. Once the modules of the access system have been transferred to the transition platform of the offshore wind turbine, the modules are assembled to form the access system. The assembling of the access system in this manner may also take place while the offshore wind turbine operates in accordance with a normal operating mode, i.e. while the offshore wind turbine produces power as it normally would.

The modular design of the access system described above allows for easy handling of the access system during transport and transfer to the transition platform, even if the assembled access system is heavy and bulky.

It should be noted that the access system may be assembled at a support scaffold or the like provided on or near the transition platform, rather than on the transition platform itself. This may for example facilitate safe assembling or disassembling of the access system or secure safe parking of the access system while waiting for suitable conditions for inspection and hence overcome the need to remove the access system from the transition platform for example overnight. Furthermore, a support scaffold may raise above the fencing typically used on a transition platform and thereby allow for access systems that extend beyond the size of the transition platform in a safe manner.

Each module of the access system preferably has a weight which is smaller than or equal to about 1000 kg. This allows the individual modules to be handled using equipment, such as cranes, which is not designed for heavy lifts, without imposing restrictions on the size or weight of the assembled access system.

The method may further comprise the steps of disassembling the access system into two or more modules, and transferring the two or more modules from the transition platform, after restarting operation of the offshore wind turbine in accordance with a normal operating mode.

According to this embodiment, the access system is removed from the offshore wind turbine when the maintenance has been completed. This is done by disassembling the access system into the original modules, and subsequently removing the modules individually from the transition platform. The disassembly is performed after the operation of the offshore wind turbine has been restarted in accordance with a normal operating mode, and thereby while normal power production is obtained from the offshore wind turbine. When the access system has been disassembled the modules may be accommodated at the transition platform until a suitable sea vessel for transporting the modules away from the offshore wind turbine is available.

The access system may, e.g., be transported to another offshore wind turbine in order to perform similar maintenance on that offshore wind turbine. For instance, the offshore wind turbines may be arranged in the same offshore wind farm. As an alternative, the access system may remain at the transition platform of the offshore wind turbine after the maintenance has been completed.

The step of performing maintenance may comprise hoisting the access system in an upwards direction from the transition platform. According to this embodiment, the access system is moved upwards from the transition platform towards the outer surface(s) which require(s) maintenance. The transition platform will normally be positioned below the lowest level where the tips of the wind turbine blades pass the tower. The outer surfaces which require maintenance, whether it is outer surfaces of wind turbine blades, tower, nacelle or other suitable outer surfaces, will often be arranged above this level. Accordingly, the access system needs to be moved in an upwards direction from the transition platform in order to reach the relevant outer surface(s). The hoisting may, e.g., be performed using one or more wires attached to the access system and connected to a nacelle of the offshore wind turbine. Hoisting equipment, e.g. in the form of one or more winches, may be arranged in the nacelle. Alternatively, the wires may be connected to hoisting equipment arranged at a lower position, e.g. at the transition platform, via pulleys or the like arranged on the nacelle.

The step of transferring the access system to the transition platform may be performed by means of a permanent crane arranged at or near the transition platform. The permanent crane may, e.g., be used for transferring various equipment from sea vessels to the transition platform. The permanent crane may be arranged on the transition platform. Alternatively, it may be arranged near the transition platform, e.g. mounted on the tower, as long as it is capable of transferring equipment, including the access system, to the transition platform.

The step of performing maintenance on an outer surface of at least one wind turbine part of the offshore wind turbine may comprise performing maintenance on at least one wind turbine blade. According to this embodiment, at least one of the wind turbine parts is a wind turbine blade, i.e. at least one of the outer surfaces on which maintenance is performed is an outer surface of a wind turbine blade. Alternatively or additionally, at least one of the wind turbine parts may be a tower and/or a nacelle of the offshore wind turbine.

The step of performing maintenance on an outer surface of at least one wind turbine part of the offshore wind turbine may comprise inspecting the outer surface of at least one wind turbine part. The inspection may be a visual inspection. In this case relevant personnel may be on board the access system while maintenance is performed using the access system. Alternatively, the access system may be provided with suitable visual inspection equipment, such as one or more cameras, allowing personnel to perform visual inspection of the outer surface of the wind turbine part remotely.

Alternatively or additionally, other types of inspection may be performed, e.g. using ultrasound, infrared, or other suitable kinds of inspection.

Alternatively or additionally, the step of performing maintenance on an outer surface of at least one wind turbine part of the offshore wind turbine may comprise performing repair of the wind turbine part, coating or painting the outer surface of the wind turbine part, cleaning the outer surface of the wind turbine part, replacing lost or malfunctioning elements, such as sensors, lights, lightning conductors, coolers, air brakes, aerodynamic elements, etc., adding such elements, preparing for later replacement of larger components of the offshore wind turbine, and/or any other suitable kind of maintenance.

The step of performing maintenance on an outer surface of at least one wind turbine part of the offshore wind turbine may comprise locking the access system to one of the wind turbine part(s) on which maintenance is performed. For instance, in the case that the wind turbine part is a wind turbine blade, the access system may, in this case, be locked onto the wind turbine blade. Similarly, in the case that the wind turbine part is a tower, the access system may be locked onto the tower. During the maintenance, the access system is then moved along the relevant wind turbine part, e.g. the wind turbine blade or the tower. Thereby a small distance between the access system and the outer surface on which maintenance is performed is ensured.

The method may further comprise the step of awaiting wind and/or weather conditions fulfilling predefined conditions, the step of awaiting being performed after the access system has been transferred to the transition platform and before stopping normal operation of the offshore wind turbine.

According to this embodiment, normal operation of the offshore wind turbine is not necessarily stopped immediately after the access system has been transferred to the transition platform. Instead, a suitable time slot for performing the required maintenance may be awaited before normal operation of the offshore wind turbine is stopped and the maintenance is performed. For instance, the requirements regarding wind speed, wind direction, temperature, humidity, precipitation, etc. may be stricter with respect to performing the required maintenance than with respect to transporting the access system to the site of the offshore wind turbine and transferring it to the transition platform. Furthermore, it may be desirable to perform the maintenance at a time where the wind speed is very low, and the power production which could have been obtained during the time where normal operation of the offshore wind turbine is stopped is as low as possible. Thereby the loss in power production can be minimised, and ideally a time period can be selected where the wind speed is below a cut-in wind speed for the offshore wind turbine, in which case there will be no power production loss.

Other factors may also be taken into account, such as the availability of relevant personnel, when selecting the time slot for performing the maintenance.

Thus, according to this embodiment, the access platform can be transported to the site of the offshore wind turbine and transferred to the transition platform of the offshore wind turbine, at a time where a suitable sea vessel is available and the wind and/or weather conditions allow for the transport and transfer, but without taking into account whether or not the wind and/or weather conditions are suitable for performing the maintenance or whether or not relevant personnel is available. This allows for more flexibility when planning the transport and transfer of the access system.

The access system is then simply accommodated at the transition platform, ready to perform the maintenance, until the wind and/or weather conditions fulfil the predefined conditions, allowing the maintenance to be performed smoothly. Only then normal operation of the offshore wind turbine is stopped, the actual maintenance is performed, and normal operation of the offshore wind turbine is restarted. Accordingly, normal operation of the offshore wind turbine is only stopped while the actual maintenance is performed, and a time slot which minimises the power production loss during the stop of operation can be selected. Thus, the total power production loss due to the performed maintenance is minimised, not only because the duration of the time interval where it is necessary to stop operation of the wind turbine is minimised, but also because a low production time interval can be selected.

The step of awaiting wind and/or weather conditions fulfilling predefined conditions may, thus, comprise awaiting wind conditions where a wind speed is below 5 m/s. As described above, the power production of a wind turbine is low when the wind speed is low, and therefore it is an advantage to select a time slot where the wind speed is below 5 m/s.

The method may further comprise the steps of:
interrupting the step of performing maintenance and returning the access system to the transition platform,
restarting operation of the offshore wind turbine in accordance with a normal operating mode, and
stopping operation of the offshore wind turbine and completing the step of performing maintenance at a later point in time.

According to this embodiment, in the case that conditions change, the step of performing maintenance may be interrupted, and the maintenance process may be completed at a later point in time, e.g. when conditions are more suitable. For instance, the wind speed may increase to an extent where a significant power production could be expected from the offshore wind turbine. In this case it may be advantageous to interrupt the maintenance process, return the access system to the transition platform and restart normal operation of the offshore wind turbine. Thereby the power production of the offshore wind turbine is obtained during the high wind speed period, and the completion of the maintenance process is deferred until the wind speed is once again lower.

As an alternative, the maintenance process may be interrupted as described above if the wind and/or weather conditions change in such a manner that it is not possible or safe to continue performing maintenance. Using the method according to the invention, interrupting the maintenance and restarting the wind turbine operation can be done without having to move the access system away from the wind turbine, but rather by parking the access system to the transition platform. Another alternative is when maintenance extends more than one dayshift and can only be conducted in daylight. Here, the wind turbine may produce energy at night without the need to remove the access system from the platform. This may for example be the case when only one blade can be maintained during one dayshift.

In any event, it is an advantage that normal operation of the offshore wind turbine can be restarted while the maintenance process is interrupted, since this even further reduces the power production loss caused by the maintenance.

In one embodiment, the step of stopping normal operation of the offshore wind turbine may be performed at least 3 hours after completion of the step of transferring the access system to the transition platform. According to this embodiment, normal operation of the offshore wind turbine is not stopped immediately after the access system has been transferred to the transition platform. Instead, at least 3 hours are allowed to elapse, e.g. in order to await optimal conditions for stopping normal operation of the offshore wind turbine and performing the maintenance, as described above. Furthermore, waiting for at least 3 hours from the transfer of the access system to the transition platform until normal operation of the offshore wind turbine is stopped will allow the sea vessel which has transported the access system to the site of the offshore wind turbine to be removed from the site before the maintenance process is started.

The method may further comprise the step of temporarily attaching the access system to the transition platform by means of attachment means provided on the access system and/or on the transition platform. According to this embodiment, the access system is temporarily fixed to the transition platform, e.g. while suitable conditions for performing the maintenance is awaited.

The attachment means, e.g. in the form of clamps, straps, etc., may be provided only on the transition platform. In this case the attachment means should be positioned and designed in a manner which allows them to grip or retain suitable portions of the access system.

As an alternative, the attachment means may be provided only on the access system. In this case the attachment means should be positioned and designed in a manner which allows them to grip or retain suitable portions, e.g. a railing, of a standard transition platform. In this case no changes need to be made to the transition platform in order to allow the access system to be temporarily attached thereto.

As another alternative, attachment means may be provided on the transition platform as well as on the access system. In this case the attachment means may include mating or engaging portion provided on the transition platform and the access system, respectively, which when mating or engaging secure the transition platform and the access system to each other.

The step of transferring the access system to the transition platform may comprise transferring the access system to a support scaffold arranged on or near the transition platform. According to this embodiment, the access system is transferred to the support scaffold rather than directly onto the transition platform. The access system may further be temporarily attached to the support scaffold in the manner described above.

According to a second aspect, the invention provides an access system for use in a method according to the first aspect of the invention. Since the access system according to the second aspect of the invention is for use in a method according to the first aspect of the invention, the remarks set forth above with reference to the first aspect of the invention are equally applicable here.

The access system may comprise at least two detachably assembled modules. This has already been described in detail above.

BRIEF DESCRIPTION OF THE DRAWINGS

The invention will now be described in further detail with reference to the accompanying drawings in which.

DETAILED DESCRIPTION OF THE DRAWINGS

Figure 1:
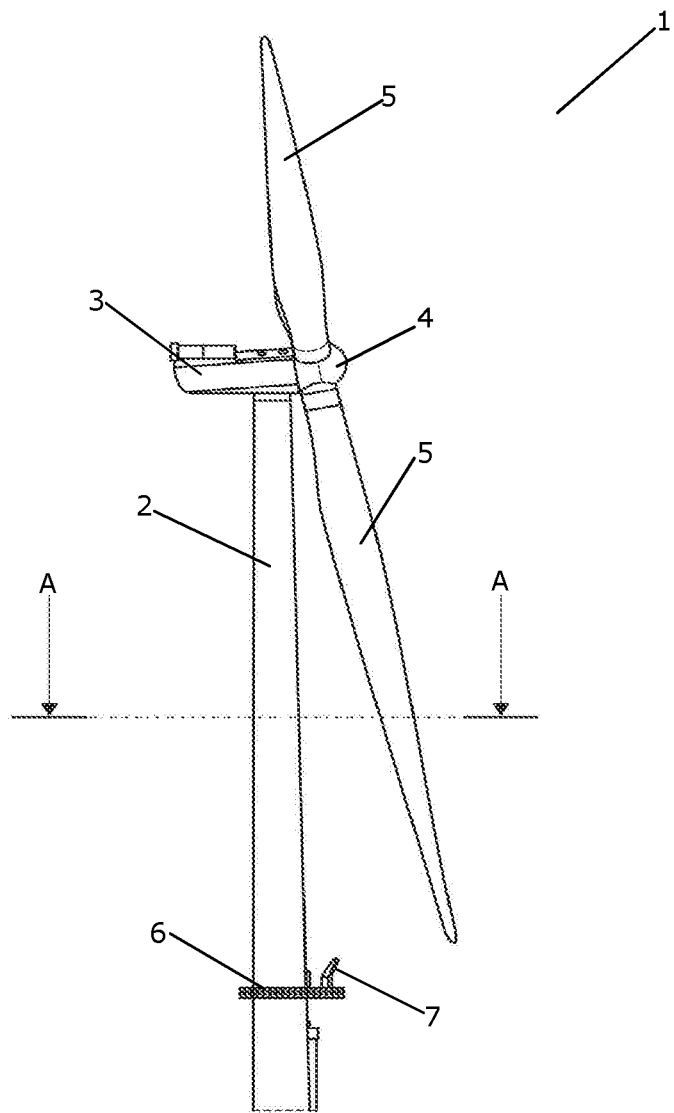
FIG. 1 is a side view of an offshore wind turbine.

FIG. 1 is a side view of an offshore wind turbine 1. The offshore wind turbine 1 comprises a tower 2 and a nacelle 3 mounted on top of the tower 2. A rotor 4 carrying three wind turbine blades 5, two of which can be seen, is mounted rotatably on the nacelle 3. A transition platform 6 is mounted on the tower 2 at a lower part thereof. The transition platform 6 may, e.g., be used for transferring equipment and/or personnel between sea vessels and the offshore wind turbine 1. A permanent crane 7 is arranged on the transition platform 6, and may be used for transferring equipment to or from the transition platform 6.

Figure 2:
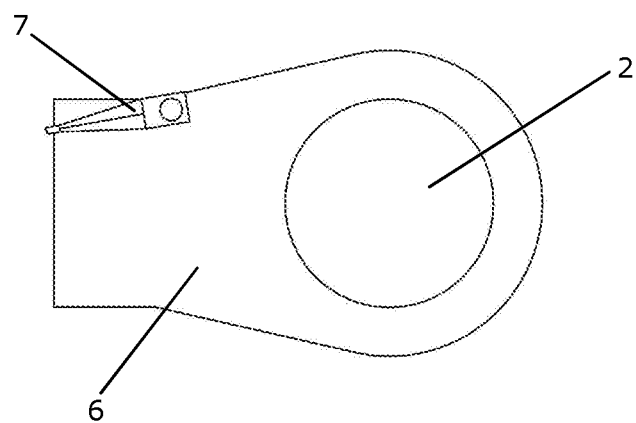
FIG. 2 is a cross sectional view of the offshore wind turbine of FIG. 1.

FIG. 2 is a cross sectional view of the offshore wind turbine 1 of FIG. 1, in the direction of the arrows A along the dotted line between the arrow points. The transition platform 6 and the permanent crane 7 arranged thereon can be clearly seen.

Figure 3:
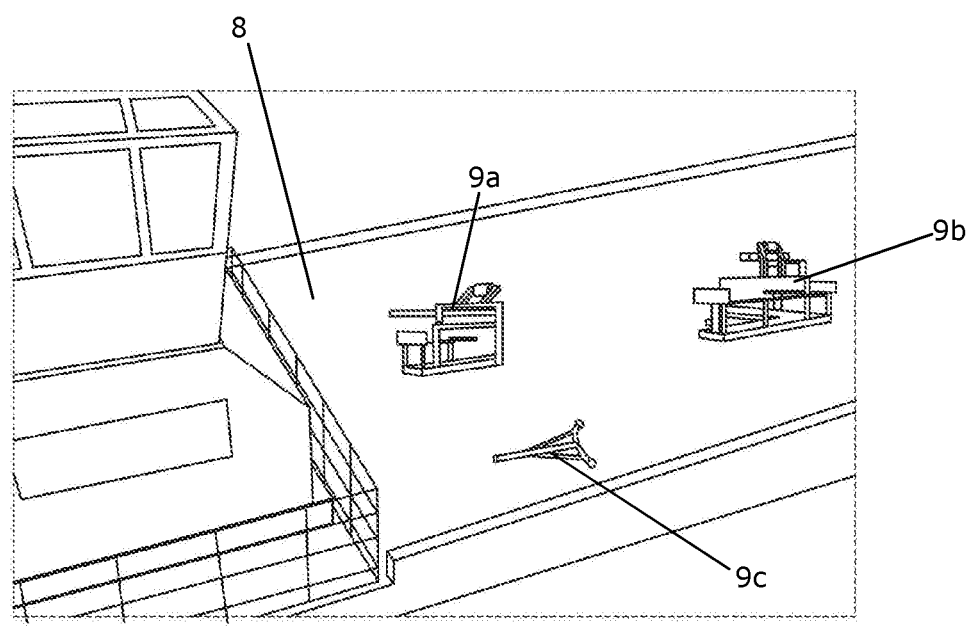
FIG. 3 shows modules of an access system according to an embodiment of the invention, arranged on a sea vessel.

FIG. 3 shows a sea vessel 8 carrying three modules 9a, 9b, 9c for an access system according to an embodiment of the invention. The modules 9a, 9b, 9c are transported separately by means of the sea vessel 8, but can be assembled into an access system according to an embodiment of the invention. This will be described in further detail below.

Figure 4:
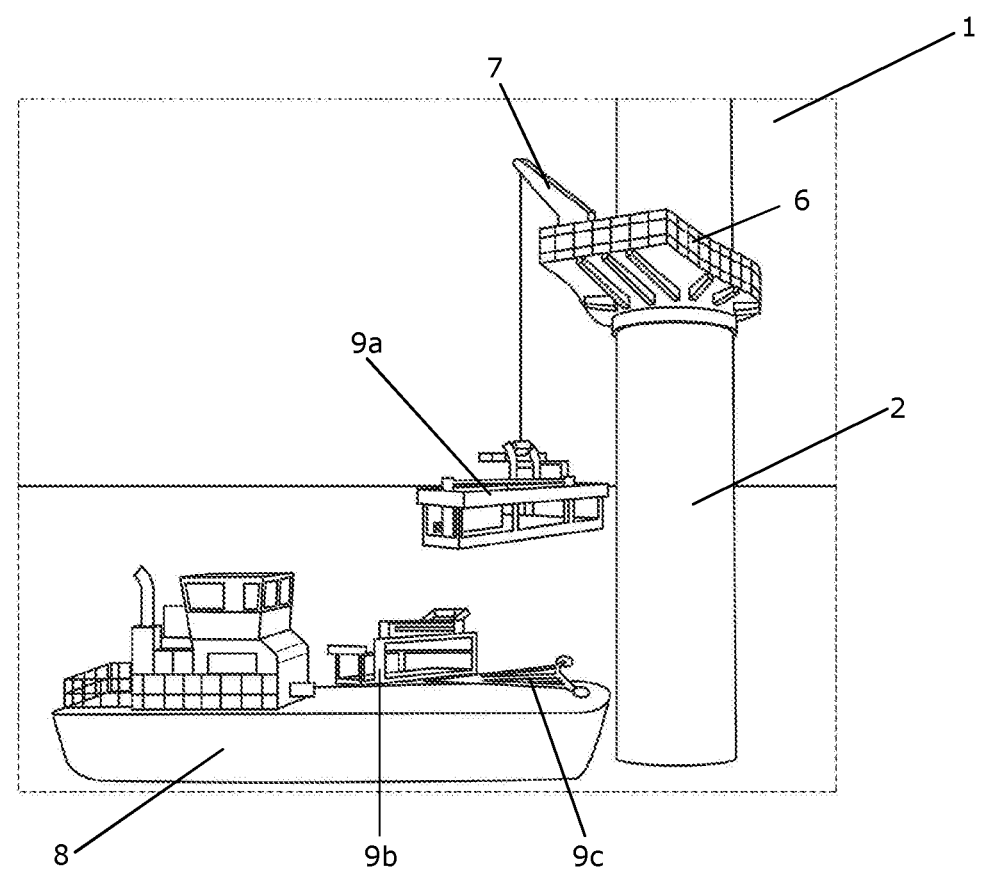
FIG. 4 shows the modules of FIG. 3 in the process of being transferred to a transition platform.

FIG. 4 shows the sea vessel 8 of FIG. 3 arranged adjacent to an offshore wind turbine 1. The offshore wind turbine 1 has a transition platform 6 which is provided with a permanent crane 7, and it could, e.g., be the offshore wind turbine 1 of FIGS. 1 and 2. The permanent crane 7 is in the process of lifting one of the modules 9a onto the transition platform 6. The remaining two modules 9b, 9c are still arranged on the sea vessel 8. Accordingly, the modules 9a, 9b, 9c are lifted, one at a time, onto the transition platform 6 by means of the permanent crane 7. Thereby an access system which is heavier than the lifting capacity of the permanent crane 7 can be lifted onto the transition platform 6 without requiring an additional crane with a larger lifting capacity. The transfer of the modules 9a, 9b, 9c from the sea vessel 8 to the transition platform 6 is performed while the offshore wind turbine 1 operates in accordance with a normal operating mode, i.e. normal power production of the offshore wind turbine 1 is maintained during the transfer.

Figure 5:
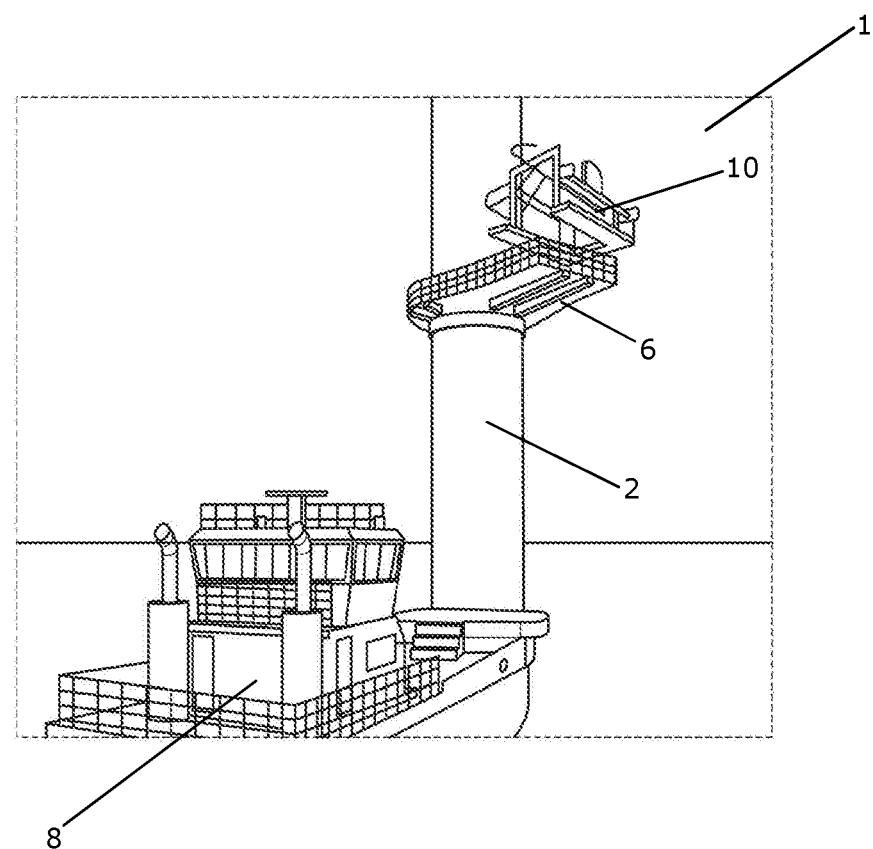
FIGS. 5-8 show an access system according to an embodiment of the invention arranged at a transition platform.

In FIG. 5 all of the modules 9a, 9b, 9c have been lifted onto the transition platform 6, and the modules 9a, 9b, 9c have been assembled to form an access system 10. The access system 10 can be used for performing maintenance on an outer surface of at least one wind turbine part in a manner which will be described in further detail below. The assembled access system 10 is accommodated at the transition platform 6. The offshore wind turbine 1 is still operated in accordance with a normal operating mode, i.e. no power production loss has yet been introduced.

Figure 6:
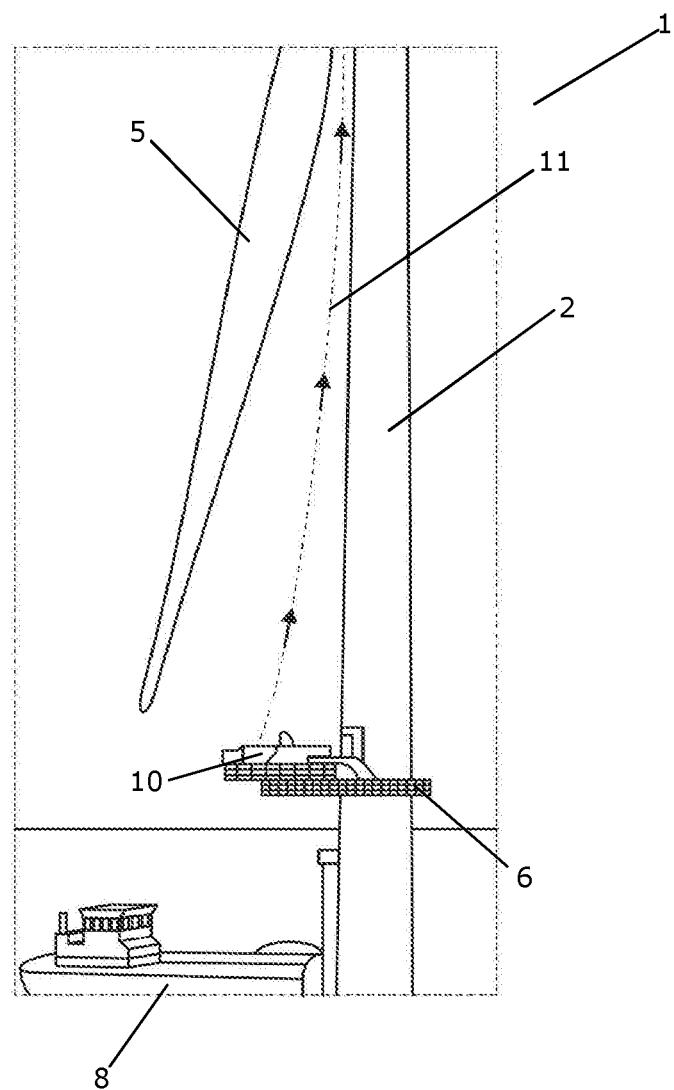

In FIG. 6 the access system 10 has been connected to the nacelle (not visible) of the offshore wind turbine 1 by a number of cables 11, one of which is shown. This requires that normal operation of the offshore wind turbine 1 is stopped in order to avoid collisions between the wind turbine blades 5 and the cables 11. Thus, the access platform 10 is now ready to be hoisted in an upwards direction by means of the cables 11, in order to perform maintenance on an outer surface of at least one wind turbine part.

Figure 7:
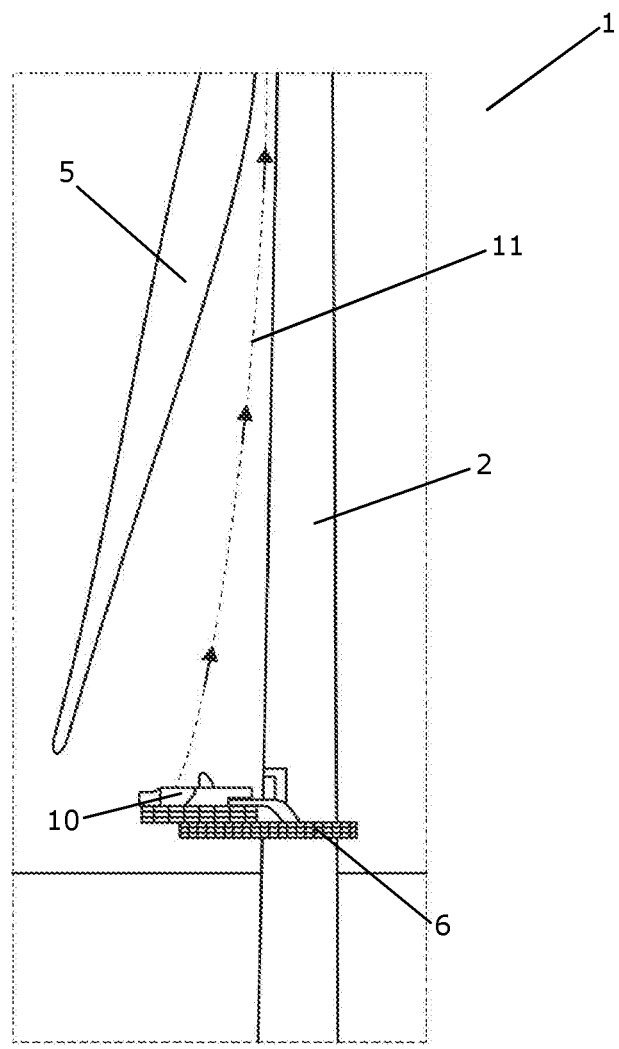

In FIG. 7 the sea vessel has left the position adjacent to the offshore wind turbine 1, thereby illustrating that the presence of the sea vessel is not required while the maintenance is performed.

Figure 8:
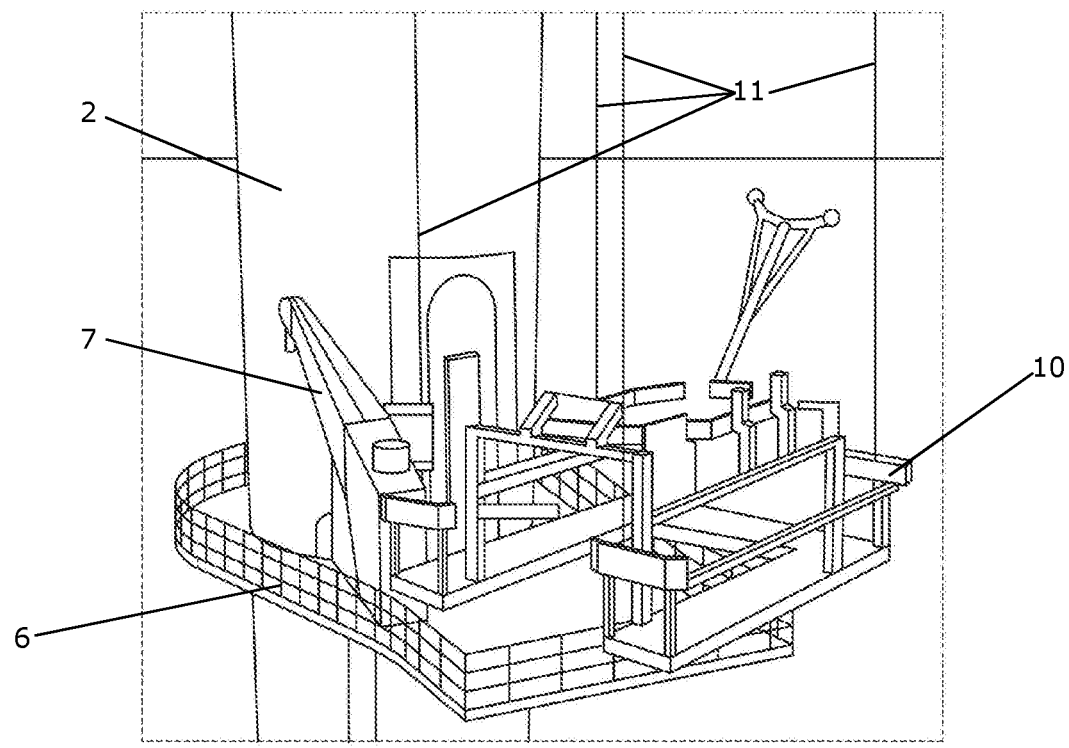

FIG. 8 shows the assembled access system 10 in the process of being hoisted from the transition platform 6 by means of the cables 11, in order to use the access system 10 for performing maintenance on an outer surface of a wind turbine part.

Figure 9:
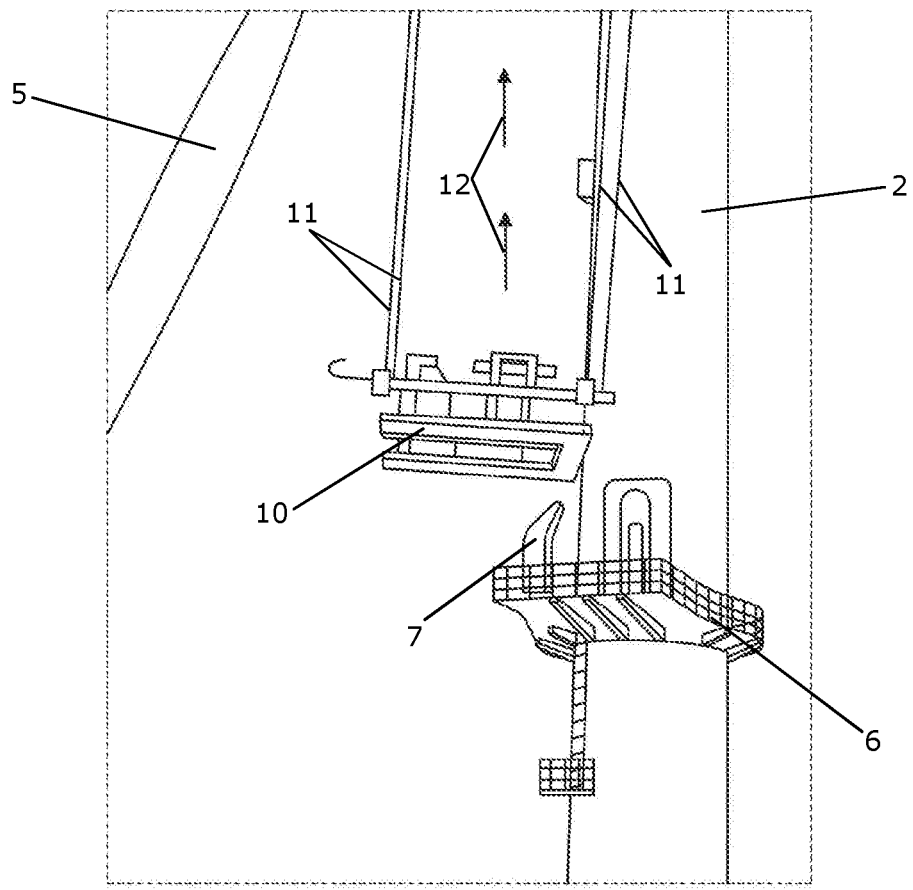
FIGS. 9-12 illustrate an access system according to an embodiment of the invention performing maintenance on an outer surface of a wind turbine part in accordance with a method according to an embodiment of the invention.

In FIG. 9 the access system 10 has been hoisted clear of the transition platform 6 by means of the cables 11, and is on its way towards a wind turbine blade 5, as indicated by arrows 12.

Figure 10:
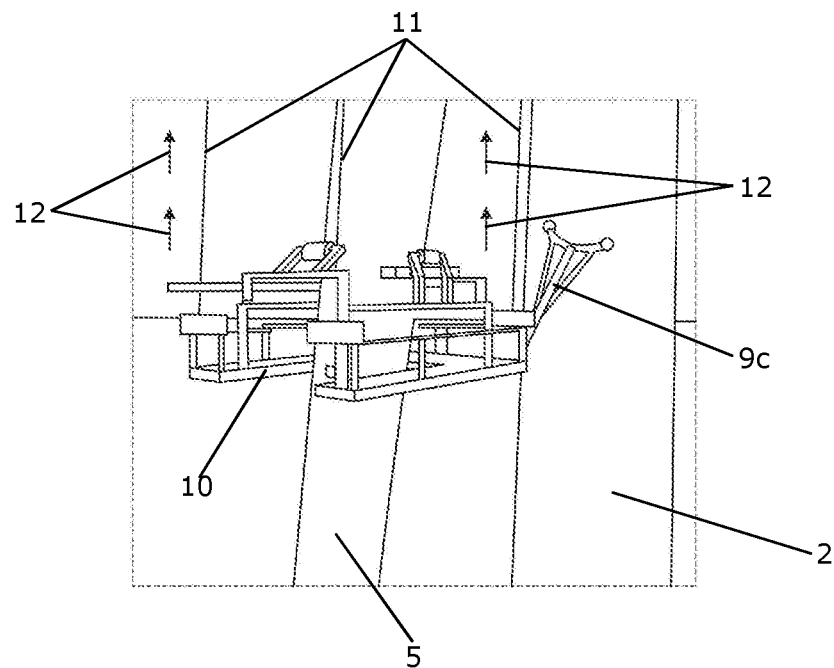

In FIG. 10 the access system 10 is locked onto a wind turbine blade 5, and is moved along the wind turbine blade 5 in an upwards direction by means of the cables 11, as indicated by arrows 12. Thereby maintenance can be performed on an outer surface of the wind turbine blade 5 by means of the access system 10. For instance, personnel may be present on the access system 10, thereby allowing the personnel to visually inspect the outer surface of the wind turbine blade 5. Alternatively or additionally, the access system 10 may be provided with equipment required for performing relevant kinds of maintenance on the outer surface of the wind turbine blade 5, such as cleaning, painting or coating, replacement, removal or addition of elements, such as sensors, lights, etc. and/or any other suitable kind of maintenance.

Module 9*c* rests against the tower 2 during the movement of access system 10 along the wind turbine blade 5. This provides guidance for the access system 10 in the horizontal direction during movement of the access system.

Figure 11:
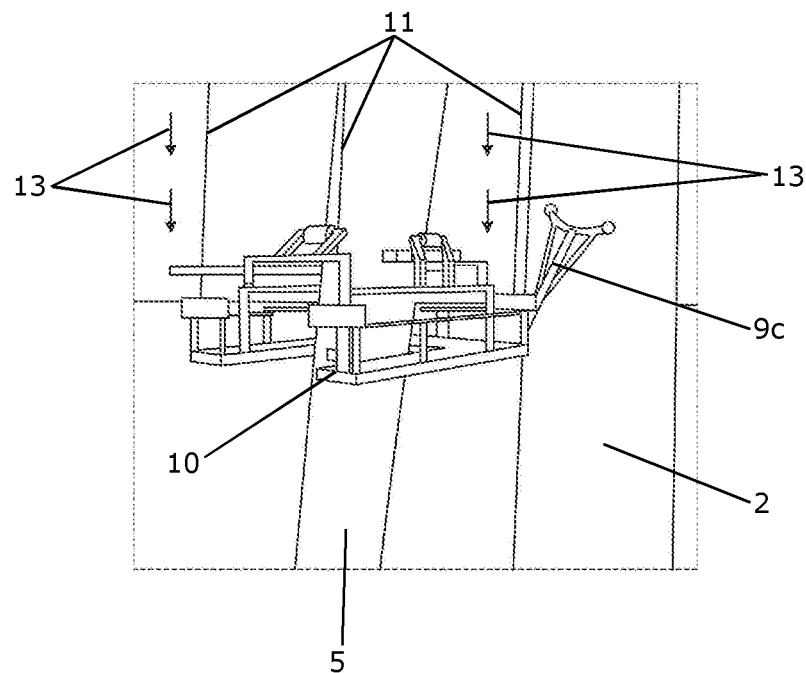

In FIG. 11 the access system 10 is in the process of being lowered along the wind turbine blade 5, as indicated by arrows 13. Thus, in FIG. 11 the maintenance on the outer surface of the wind turbine blade 5 has been completed, and the access system 10 is in the process of being returned to the transition platform to allow normal operation of the offshore wind turbine to be restarted.

Figure 12:
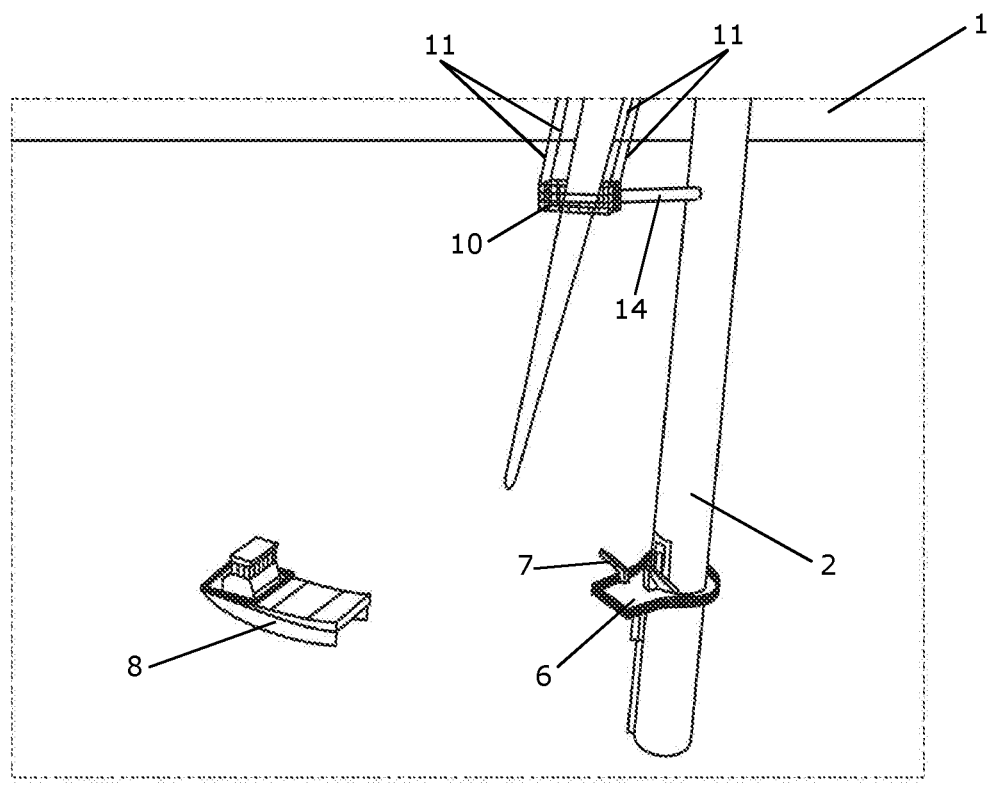

FIG. 12 also shows an access system 10 according to an embodiment of the invention locked onto a wind turbine blade 5 while performing maintenance on the outer surface of the wind turbine blade 5. In the embodiment illustrated in FIG. 12, an extendable beam 14 extends between the access system 10 and the tower 2. The extendable beam 14 ensures that an appropriate distance is maintained between the access system 10 and the tower 2 as the access system 10 is moved along the wind turbine blade 5. In other words, an extendable beam 14 may replace (or complement) the module 9*c* (for example seen in FIG. 11) of the access system 10.

A sea vessel 8 is on its way to the offshore wind turbine 1 in order to receive the access platform 10 and transport it away from the site of the offshore wind turbine 1 when it has been returned to the transition platform 6 and normal operation of the offshore wind turbine 1 has been restarted. This may allow the access system 10 to be used for performing maintenance on other offshore wind turbines arranged in the vicinity of the offshore wind turbine 1.

The invention claimed is:

1. A method for performing maintenance on an outer surface of at least one wind turbine part of an offshore wind turbine, the method comprising the steps of:
   transporting an access system to a site of the offshore wind turbine,
   transferring the access system to a transition platform at a lower part of the offshore wind turbine, while operating the offshore wind turbine in accordance with a normal operating mode,
   stopping normal operation of the offshore wind turbine,
   performing maintenance on an outer surface of at least one wind turbine part of the offshore wind turbine, using the access system, and
   restarting normal operation of the offshore wind turbine in accordance with a normal operating mode when the maintenance has been completed,
   wherein the access system comprises two or more detachably assembled modules,
   wherein the step of transferring the access system to the transition platform comprises transferring the two or more modules to the transition platform, and
   wherein the method further comprises the step of assembling the access system from the two or more modules at the transition platform.

2. The method according to claim 1, wherein each module of the access system has a weight which is smaller than or equal to 1000 kg.

3. The method according to claim 1, further comprising the steps of disassembling the access system into two or more modules, and transferring the two or more modules from the transition platform, after restarting operation of the offshore wind turbine in accordance with a normal operating mode.

4. The method according to claim 1, wherein the step of performing maintenance comprises hoisting the access system in an upwards direction from the transition platform.

5. The method according to claim 1, wherein the step of transferring the access system to the transition platform is performed by means of a permanent crane arranged at or near the transition platform.

6. The method according to claim 1, wherein the step of performing maintenance on an outer surface of at least one wind turbine part of the offshore wind turbine comprises performing maintenance on at least one wind turbine blade.

7. The method according to claim 1, wherein the step of performing maintenance on an outer surface of at least one wind turbine part of the offshore wind turbine comprises inspecting the outer surface of at least one wind turbine part.

8. The method according to claim 1, wherein the step of performing maintenance on an outer surface of at least one wind turbine part of the offshore wind turbine comprises locking the access system to one of the wind turbine part(s) on which maintenance is performed.

9. The method according to claim 1, further comprising the step of awaiting wind and/or weather conditions fulfilling predefined conditions, the step of awaiting being performed after the access system has been transferred to the transition platform and before stopping normal operation of the offshore wind turbine.

10. The method according to claim 9, wherein the step of awaiting wind and/or weather conditions fulfilling predefined conditions comprises awaiting wind conditions where a wind speed is below 5 m/s.

11. The method according to claim 1, further comprising the steps of:
- interrupting the step of performing maintenance and returning the access system to the transition platform,
- restarting operation of the offshore wind turbine in accordance with a normal operating mode, and
- stopping operation of the offshore wind turbine and completing the step of performing maintenance at a later point in time.

12. The method according to claim 1, wherein the step of stopping normal operation of the offshore wind turbine is performed at least three hours after completion of the step of transferring the access system to the transition platform.

13. The method according to claim 1, further comprising the step of temporarily attaching the access system to the transition platform by means of attachment means provided on the access system and/or on the transition platform.

* * * * *